(12) United States Patent
Wessner

(10) Patent No.: US 10,337,702 B2
(45) Date of Patent: Jul. 2, 2019

(54) METHODS AND APPARATUS FOR OPTIC HOLDER DESIGN

(71) Applicant: SIGNIFY HOLDING B.V., Eindhoven (NL)

(72) Inventor: Zachary Robert Wessner, Salem, NH (US)

(73) Assignee: SIGNIFY HOLDING B.V., Eindhoven (NL)

( * ) Notice: Subject to any disclaimer, the term of this patent is extended or adjusted under 35 U.S.C. 154(b) by 49 days.

(21) Appl. No.: 15/329,929

(22) PCT Filed: Jul. 29, 2015

(86) PCT No.: PCT/IB2015/055720
§ 371 (c)(1),
(2) Date: Jan. 27, 2017

(87) PCT Pub. No.: WO2016/016815
PCT Pub. Date: Feb. 4, 2016

(65) Prior Publication Data
US 2017/0268751 A1     Sep. 21, 2017

Related U.S. Application Data

(60) Provisional application No. 62/030,748, filed on Jul. 30, 2014.

(51) Int. Cl.
| F21V 17/04 | (2006.01) |
| G02B 19/00 | (2006.01) |
| F21V 5/00 | (2018.01) |
| F21V 7/00 | (2006.01) |
| F21Y 105/10 | (2016.01) |
| F21Y 115/10 | (2016.01) |

(52) U.S. Cl.
CPC .............. *F21V 17/04* (2013.01); *F21V 5/007* (2013.01); *G02B 19/0066* (2013.01); *F21V 7/0091* (2013.01); *F21Y 2105/10* (2016.08); *F21Y 2115/10* (2016.08)

(58) Field of Classification Search
CPC . F21V 17/004; F21V 7/0091; G02B 19/0066; F21Y 2105/10
See application file for complete search history.

(56) References Cited

U.S. PATENT DOCUMENTS 7,832,897 B2   11/2010  Ku
8,210,734 B2    7/2012  Wu
(Continued)

FOREIGN PATENT DOCUMENTS

CN    101761787 A    6/2010
CN    101701676 B    7/2011
(Continued)

*Primary Examiner* — Anabel Ton
(74) *Attorney, Agent, or Firm* — Akarsh P. Belagodu

(57) ABSTRACT

A lighting system (100) including a plurality of LED-based light sources (102), where each of the light sources includes an optic holder (210) with an upper edge region (260). The arrangement of the optic holders within the lighting system results in gaps (220) between neighboring optic holders. The system includes a plurality of interstitial spacers (310) manufactured on or attached to the upper edge region of the optic holders, such that the interstitial spacers are arranged to substantially fill the one or more gaps.

12 Claims, 7 Drawing Sheets

(56) References Cited

U.S. PATENT DOCUMENTS

| | | |
|---|---|---|
| 9,605,830 B1 * | 3/2017 | Winters .................. F21V 5/007 |
| 2009/0316407 A1 | 12/2009 | Lin |
| 2010/0110660 A1 | 5/2010 | Brukilacchio |
| 2010/0195330 A1 | 8/2010 | Schaefer et al. |
| 2012/0230030 A1 | 9/2012 | Miller et al. |
| 2013/0021797 A1 | 1/2013 | Kubo |
| 2014/0016326 A1 | 1/2014 | Dieker et al. |
| 2017/0175992 A1 * | 6/2017 | Guillet .................... F21V 3/062 |
| 2017/0254490 A1 * | 9/2017 | Brunt, Jr. .................. F21S 8/02 |

FOREIGN PATENT DOCUMENTS

| | | | |
|---|---|---|---|
| EP | 2309296 A1 | 4/2011 | |
| GB | 2391702 A | 2/2004 | |

\* cited by examiner

METHODS AND APPARATUS FOR OPTIC HOLDER DESIGN

CROSS-REFERENCE TO PRIOR APPLICATIONS

This application is the U.S. National Phase application under 35 U.S.C. § 371 of International Application No. PCT/IB2015/055720, filed on Jul. 29, 2015, which claims the benefit of U.S. Provisional Patent Application No. 62/030,748, filed on Jul. 30, 2014. These applications are hereby incorporated by reference herein.

TECHNICAL FIELD

The present invention is directed generally to the design of optic holders. More particularly, various inventive methods and apparatus disclosed herein relate to functional optic holders designed to achieve a symmetrical aesthetic appearance.

BACKGROUND

Lighting systems that incorporate light-emitting diode (LED) technology often use optics to achieve a desired light output. For example, since light is emitted by most LEDs in an unfocused and broad pattern, LED lighting systems often use mirrors, collimators, or focusing optics to focus, manipulate, and direct the emitted light. A total internal reflector is just one example of an optic utilized to redirect emitted light. These optics are typically held in position about the LEDs with individual optic holders or an optic tray.

The LEDs themselves are placed on a printed circuit board in an arrangement called the LED layout. The LED layout pattern is dependent upon a wide variety of factors, including heating considerations, lighting requirements, and aesthetics, among many others. Accordingly, the LED layout pattern can be individually customized. However, the LED layout pattern, the optics, and the optic holders must be designed in tandem in order to maintain both functionality and aesthetics. For example, in many layouts where the optics are located directly above each LED, there is a gap between each optic. In instances where an optic tray is utilized in a lighting system design, the gaps are hidden with the tray material. When individual optic holders are utilized in a lighting system design, the gaps will remain and are visible by an observer. The observer will be able to discern height differences between the top of the optic and the printed circuit board below, presenting a non-uniform visual appearance. Additionally, if fasteners are used to hold down the LED printed circuit board they are often visible through the gaps.

Although optic trays are visually appealing, each optic location in the tray must be qualified and must be held within very tight design tolerances. Since optics and optic trays are typically injection molded in large volumes, every new lighting system design will require a unique mold, which can be both inefficient and expensive. In contrast, individual optic holders can be moved and adapted to a new design without requiring a new optic holder design or manufacturing, although the unsightly gaps may remain.

Accordingly, there is a need in the art for methods and lighting systems that utilize optic holders but do not have aesthetically displeasing gaps between the individual optic holders.

SUMMARY

The present disclosure is directed to inventive methods and apparatus for functional optic holders designed to achieve an aesthetic appearance. In view of the foregoing, various embodiments and implementations are directed to an LED-based lighting system including optic holders having one or more interstitial spacers to fill in gaps between the optic holders in the system. Accordingly, creation of a visually aesthetic uniform surface for an LED layout pattern can be achieved using optic holders having interstitial spacers to fill in gaps, and new layout patterns can be efficiently and affordably obtained using interchangeable and/or adjustable interstitial spacers.

For example, in some embodiments, a lighting system includes multiple LED-based light sources each with an optic arranged in three-dimensional space by an optic holder. Each optic holder includes one or more interstitial spacers which cooperate to substantially fill in the gaps between neighboring optic holders. In some embodiments, for example, if the LED-based light sources include round optic holders arranged in an evenly-spaced grid each optic holder can include four optic spacers to create corners, and the corners of four neighboring optic holders can cooperate to substantially fill in the gaps between those four optic holders.

Generally, in one aspect, a lighting system is provided. The lighting system includes: (i) a plurality of LED-based light sources; a plurality of optic holders each of which is connected to a respective one of the plurality of LED-based light sources and is arranged to hold an optic in a position suitable to modify light emitted by said LED-based light source, each of the plurality of optic holders comprising an upper edge region, where the arrangement results in one or more gaps between the optic holders; and (iii) a plurality of interstitial spacers connected to the upper edge region of the plurality of optic holders, where the plurality of interstitial spacers are arranged to substantially fill the one or more gaps. In some embodiments, the interstitial spacers are substantially the same shape and/or size.

In some embodiments, the interstitial spacers are configured to removably attach to the upper edge region of one of the optic holders.

In some embodiments, at least one of the interstitial spacers is adjustable, where the size and/or shape of the interstitial spacer, for example, is adjustable.

According to an aspect, an optic holder system is provided. The optic holder system includes an LED-based light source, an optic, and one or more interstitial spacers in communication with an upper edge region of the optic holder. In some embodiments, at least one of the interstitial spacers is configured to removably attach to the upper edge region of the optic holder.

In some embodiments the interstitial spacers are adjustable, where the size and/or shape of the interstitial spacer, for example, is adjustable.

Generally, in another aspect, a method for generating a lighting system is provided. The method includes the step of providing a lighting system having: (i) a plurality of LED-based light sources; (ii) a plurality of optic holders each of which is connected to a respective one of the LED-based light sources and arranged to hold an optic in a position suitable to modify light emitted by the light source, each of the plurality of optic holders comprising an upper edge region, where the arrangement results in one or more gaps between one or more optic holders. The method also comprises the step of providing a plurality of interstitial spacers connected to the upper edge region of the optic holders, the plurality of interstitial spacers arranged to substantially fill the one or more gaps.

In some embodiments, the method also includes the step of adjusting one or more of the interstitial spacers to substantially fill the one or more gaps, where the step of adjusting one or more of the interstitial spacers includes adjusting the size and/or shape of the interstitial spacer.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers).

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

The term "light source" should be understood to refer to any one or more of a variety of radiation sources, including, but not limited to, LED-based sources (including one or more LEDs as defined above).

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "spectrum" should be understood to refer to any one or more frequencies (or wavelengths) of radiation produced by one or more light sources. Accordingly, the term "spectrum" refers to frequencies (or wavelengths) not only in the visible range, but also frequencies (or wavelengths) in the infrared, ultraviolet, and other areas of the overall electromagnetic spectrum. Also, a given spectrum may have a relatively narrow bandwidth (e.g., a FWHM having essentially few frequency or wavelength components) or a relatively wide bandwidth (several frequency or wavelength components having various relative strengths). It should also be appreciated that a given spectrum may be the result of a mixing of two or more other spectra (e.g., mixing radiation respectively emitted from multiple light sources).

For purposes of this disclosure, the term "color" is used interchangeably with the term "spectrum." However, the term "color" generally is used to refer primarily to a property of radiation that is perceivable by an observer (although this usage is not intended to limit the scope of this term). Accordingly, the terms "different colors" implicitly refer to multiple spectra having different wavelength components and/or bandwidths. It also should be appreciated that the term "color" may be used in connection with both white and non-white light.

The term "color temperature" generally is used herein in connection with white light, although this usage is not intended to limit the scope of this term. Color temperature essentially refers to a particular color content or shade (e.g., reddish, bluish) of white light. The color temperature of a given radiation sample conventionally is characterized according to the temperature in degrees Kelvin (K) of a black body radiator that radiates essentially the same spectrum as the radiation sample in question. Black body radiator color temperatures generally fall within a range of from approximately 700 degrees K (typically considered the first visible to the human eye) to over 10,000 degrees K; white light generally is perceived at color temperatures above 1500-2000 degrees K.

Lower color temperatures generally indicate white light having a more significant red component or a "warmer feel," while higher color temperatures generally indicate white light having a more significant blue component or a "cooler feel." By way of example, fire has a color temperature of approximately 1,800 degrees K, a conventional incandescent bulb has a color temperature of approximately 2848 degrees K, early morning daylight has a color temperature of approximately 3,000 degrees K, and overcast midday skies have a color temperature of approximately 10,000 degrees K. A color image viewed under white light having a color temperature of approximately 3,000 degree K has a relatively reddish tone, whereas the same color image viewed under white light having a color temperature of approximately 10,000 degrees K has a relatively bluish tone.

The term "lighting fixture" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "addressable" is used herein to refer to a device (e.g., a light source in general, a lighting unit or fixture, a controller or processor associated with one or more light sources or lighting units, other non-lighting related devices, etc.) that is configured to receive information (e.g., data) intended for multiple devices, including itself, and to selectively respond to particular information intended for it. The term "addressable" often is used in connection with a networked environment (or a "network," discussed further below), in which multiple devices are coupled together via some communications medium or media.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

The term "user interface" as used herein refers to an interface between a human user or operator and one or more devices that enables communication between the user and the device(s). Examples of user interfaces that may be employed in various implementations of the present disclosure include, but are not limited to, switches, potentiometers, buttons, dials, sliders, a mouse, keyboard, keypad, various types of game controllers (e.g., joysticks), track balls, display screens, various types of graphical user interfaces (GUIs), touch screens, microphones and other types of sensors that may receive some form of human-generated stimulus and generate a signal in response thereto.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

It is often desirable to present an array of LED-based light sources in a visually aesthetic matter, for a wide variety of applications. For example, many lighting systems and lighting fixtures utilize multiple light sources that each include an optic arranged in three-dimensional space by an optic holder. However, the shape and spacing of optic holders typically results in visually discernible gaps between neighboring optic holders. While optic trays are used to successfully fill in gaps, the tray must be manufactured within very tight design tolerances and every new lighting system design will require an optic tray designed specifically for that system.

More generally, Applicants have recognized and appreciated that it would be beneficial to use interstitial spacers on optic holders to fill in gaps between neighboring optic holders and create a visually aesthetic uniform surface for an LED layout pattern.

In view of the foregoing, various embodiments and implementations are directed to a lighting system or fixture including multiple LED-based light sources each with an optic arranged in three-dimensional space by an optic holder. In particular, each optic holder includes one or more interstitial spacers which cooperate to substantially fill in the gaps between neighboring optic holders.

Figure 1:
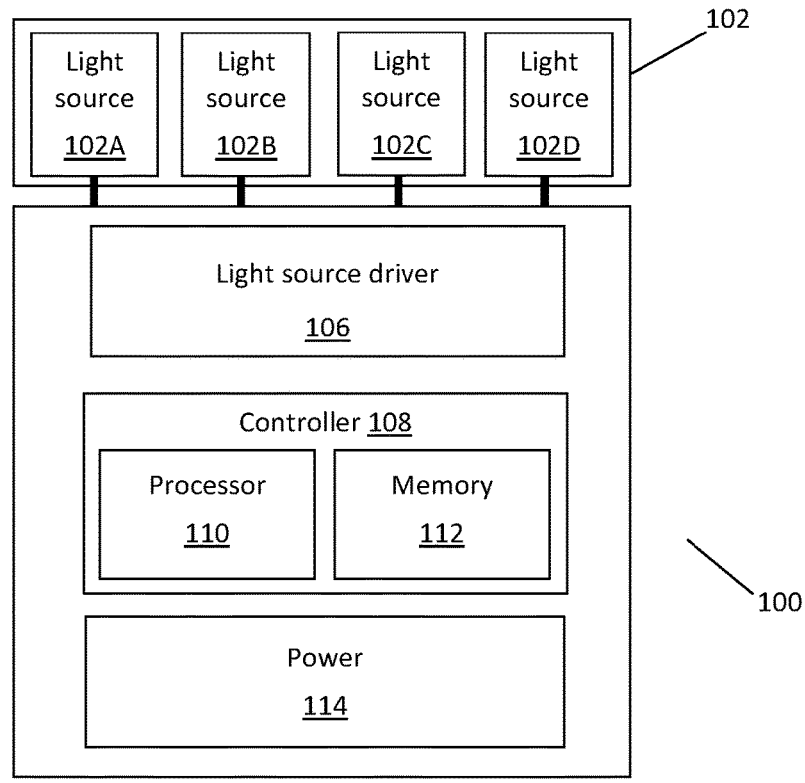
FIG. 1 is a schematic representation of a lighting system in accordance with an embodiment of the invention.

Referring to FIG. 1 is a lighting system 100 suitable for use in the lighting systems described herein. In various embodiments, the lighting system 100 shown in FIG. 1 may be utilized alone or together with other similar lighting systems in a system of lighting systems. Lighting system 100 includes one or more light sources 102A, 102B, 102C, and 102D (collectively light source 102), where one or more of the light sources may be an LED-based light source that includes one or more LEDs. The LED-based light source may have one or more LEDs, including an array of LEDs in a linear, two-dimensional, or three-dimensional configuration. The light source can be driven to emit light of a predetermined character (i.e., color intensity, color temperature, etc.). Many different numbers and various types of light sources (all LED-based light sources, LED-based and non-LED-based light sources alone or in combination, etc.) adapted to generate radiation of a variety of different colors may be employed in the lighting fixture. For example, in some embodiments, lighting system 100 includes LEDs of two or more different colors. Although FIG. 1 illustrates a lighting system 100 with four LED-based light sources 102A, 102B, 102C, and 102D (collectively light source 102), many different numbers and various types of light sources (all LED-based and non-LED-based light sources alone or in combination, etc.) adapted to generate radiation of a variety of different colors may be employed in the lighting system 100.

Lighting system 100 also includes a source of power 114, most typically AC power, although other power sources are possible including DC power sources, solar-based power sources, or mechanical-based power sources, among others. The power source may be in operable communication with a power source converter that converts power received from an external power source to a form that is usable by the lighting system.

Lighting system 100 may also include a controller 108 that is configured or programmed to output one or more signals to drive the light sources and generate varying intensities of light from the light sources. For example, controller 108 may be programmed or configured to generate a control signal for each light source to independently control the intensity of light generated by each light source, to control groups of light sources, or to control all light sources together. According to another aspect, the controller 108 may control other dedicated circuitry such as light source driver 106 which in turn controls the light sources so as to vary their intensities. Controller 108 can be, for example, a microprocessor 110 programmed using software to perform various functions discussed herein, and can be utilized in combination with a memory 112. The memory can store data, including one or more lighting commands or software programs for execution by the microprocessor 110, as well as various types of data including but not limited to specific identifiers for that lighting system.

In some embodiments, the controller 108 is coupled to and provides commands to the light source driver 106, and the light source driver 106 powers the light sources 102 based on these received commands. As one example, the controller 108 can provide control commands to the light source driver 106 to power one or more of the light sources 102 at 25% light output, and the light source driver 106 can then adjust the power provided to the light sources 102 in order to achieve 25% light output. The controller 108 and light source driver 106 may be separate but coupled components, or may be a combined component. For example, controller 108 may be included in light source driver 106.

In one embodiment, for both functional and aesthetic reasons lighting system 100 may be completely or partially housed within or integrated into an enclosure or housing. The housing or enclosure may include one or a multitude of lighting systems. Further, a single lighting system may be housed within two or more housings or enclosures, with some components of lighting system 100 packaged within a first housing and other components housed within a second housing, with electrical and/or mechanical connections between the various components (including for example, the light sources, light source driver, controller, memory, power source, user interface, and sensor). The housing or enclosure may also include a heat control mechanism such as a fan, heat sink, or other method to keep the lighting system cool and prolong their life expectancy.

Lighting system 100 may include one or more optics to optically process the radiation generated by the light sources 102A, 102B, 102C, and 102D. In some embodiments, the one or more optics may modify the spatial distribution or propagation direction of the generated radiation. Examples of optics include, but are not limited to, reflective materials, refractive materials, translucent materials, filters, lenses, mirrors, and fiber optics. The one or more optics may be completely or partially housed within or integrated into the enclosure or housing.

Figure 2A:
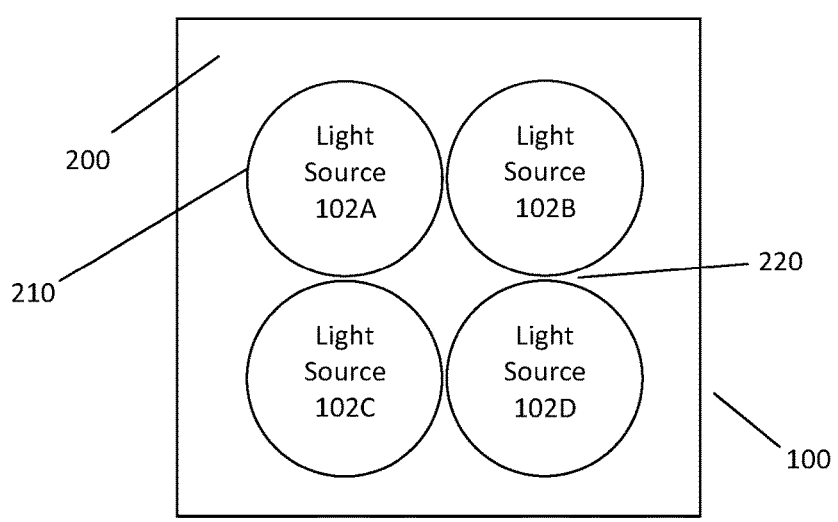
FIG. 2A is a schematic representation of an LED array and system in accordance with an embodiment of the invention.

FIG. 2A illustrates an example of a lighting system 100 in which multiple light sources 102A, 102B, 102C, and 102D are arranged in a first layout pattern on a circuit board or light source holder 200. In this top view of lighting system 100, each of light sources 102A, 102B, 102C, and 102D include an optic, and both the light source and the optic are housed within a round optic holder 210. The four light sources can be arranged in spaced relation, or with an edge of one or more optic holders 210 directly touching an edge of one or more other optic holders 210. For example, the lighting system illustrated in FIG. 2A comprises light sources 102A, 102B, 102C, and 102D arranged with a small gap 220 between each of the light sources at their closest point to a neighboring light source, resulting in larger gaps 220 at other points along their circumference.

Figure 2B:
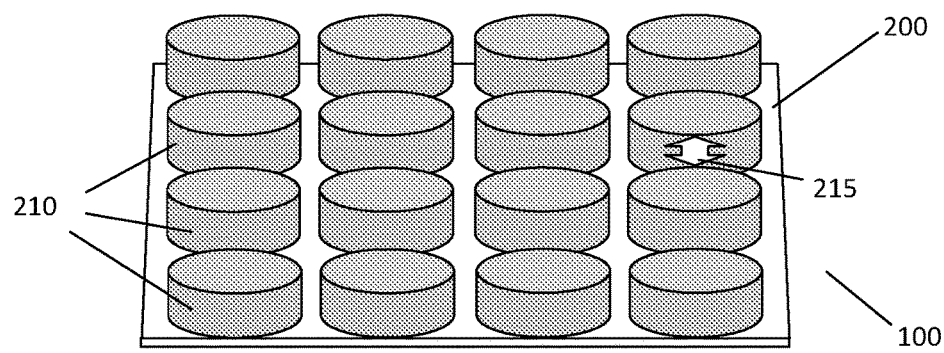
FIG. 2B is a schematic representation of an LED array and system in accordance with an embodiment of the invention.
Figure 2C:
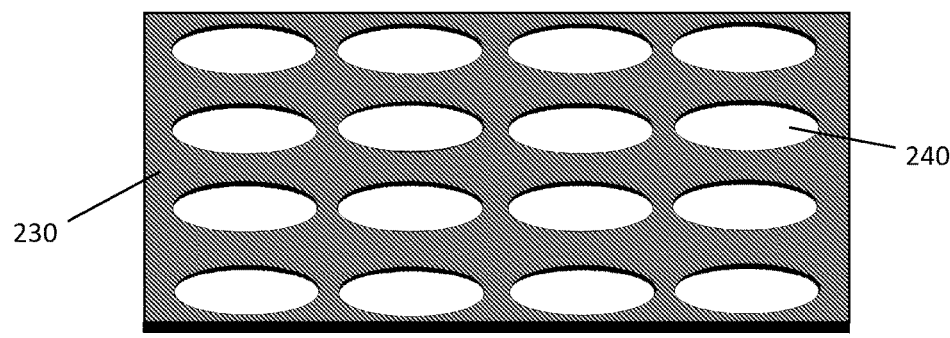
FIG. 2C is a schematic representation of an LED array cover in accordance with an embodiment of the invention.
Figure 2D:
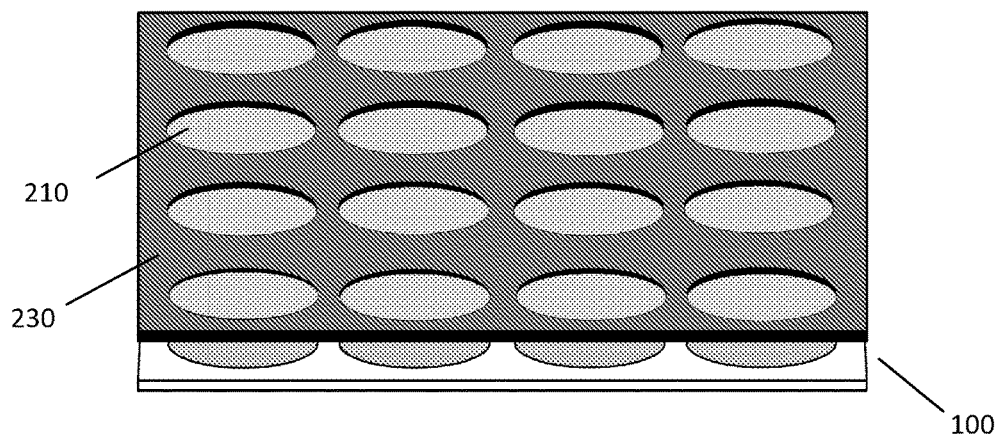
FIG. 2D is a schematic representation of an LED array and system in accordance with an embodiment of the invention.

According to an embodiment, a lighting system 100 can include multiple light sources arranged in a layout pattern on a circuit board or light source holder 200, as shown in FIG. 2B. The light sources can be arranged in spaced relation, and can include one or more optic holders 210. For example, the lighting system illustrated in FIG. 2B comprises light sources arranged within optic holders 210 in a 4×4 pattern on light source holder 200, with large gaps 215 between each of the optic holders. It is possible to cover these gaps using an LED array cover 230, shown in FIG. 2C, which has a series of openings 240 that fit over and/or around each of the optic holders 210 on the LED array 200. As shown in FIG. 2D, the LED array cover 230 fits over the optic holder pattern. The fit and arrangement can be such that the optic holders fit snugly inside the cover openings 240 to provide a flat surface, or the optic holders can extend out from the openings, among other variations. In certain variations, the LED array cover will have very thin walls to fill the gaps 215 between the optic holders, and these thin walls can be fragile or breakable.

Figure 3:
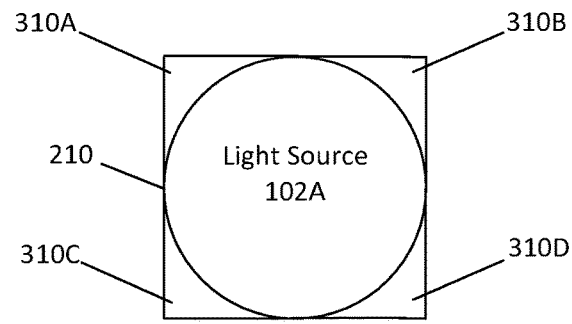
FIG. 3 is a schematic representation of an LED-based light source in accordance with an embodiment of the invention.
Figure 4:
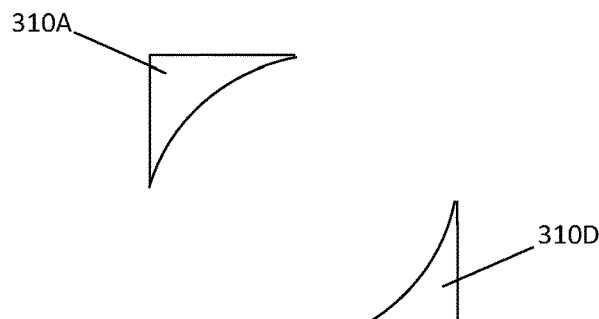
FIG. 4 is a schematic representation of interstitial spacers in accordance with an embodiment of the invention.

FIG. 3 illustrates an embodiment of a single light source 102A arranged within a round optic holder 210. At four points along, for example, the upper edge region of optic holder 210, along its circumference, interstitial spacers 310 (310A, 310B, 310C, and 310D) are attached to the optic holder. The placement of the interstitial spacers 310A converts the appearance of light source 102A and optic holder 210 from a circular format, as illustrated in FIG. 2, to the square format depicted in FIG. 3. An embodiment of interstitial spacers 310A and 310D is shown in FIG. 4.

The interstitial spacers may be attached to optic holder 210 using any of a wide variety of attachment formats and mechanisms. For example, the interstitial spacer may include a hook portion that snaps onto the edge of optic holder 210 to hold the spacer firmly in place, although according to an embodiment the spacer may be able to slide along the edge of the optic holder even when snapped into place, thereby allowing fine adjustment of the location of the spacer. Alternatively, the interstitial spacer can adhere to the optic holder using glue or another adhesive. The interstitial spacer can be held in place by Velcro, nails, tacks, pins, or any other attachment device, mechanism or means. According to another embodiment, the interstitial spacer is an integral component of the optic holder, either being manufactured with the optic holder in a single mold, or being permanently added to the optic holder after manufacture.

Figure 5:
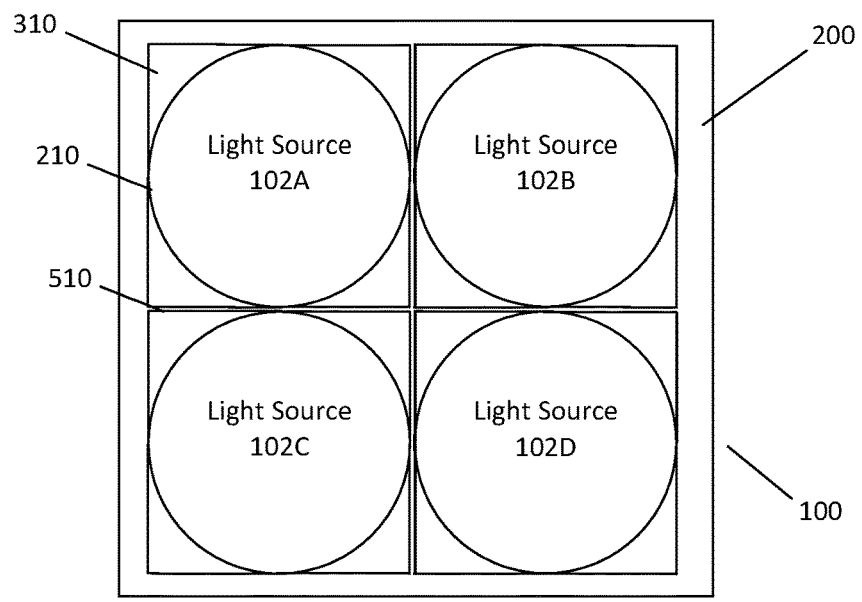
FIG. 5 is a schematic representation of an LED array and system in accordance with an embodiment of the invention.
Figure 6:
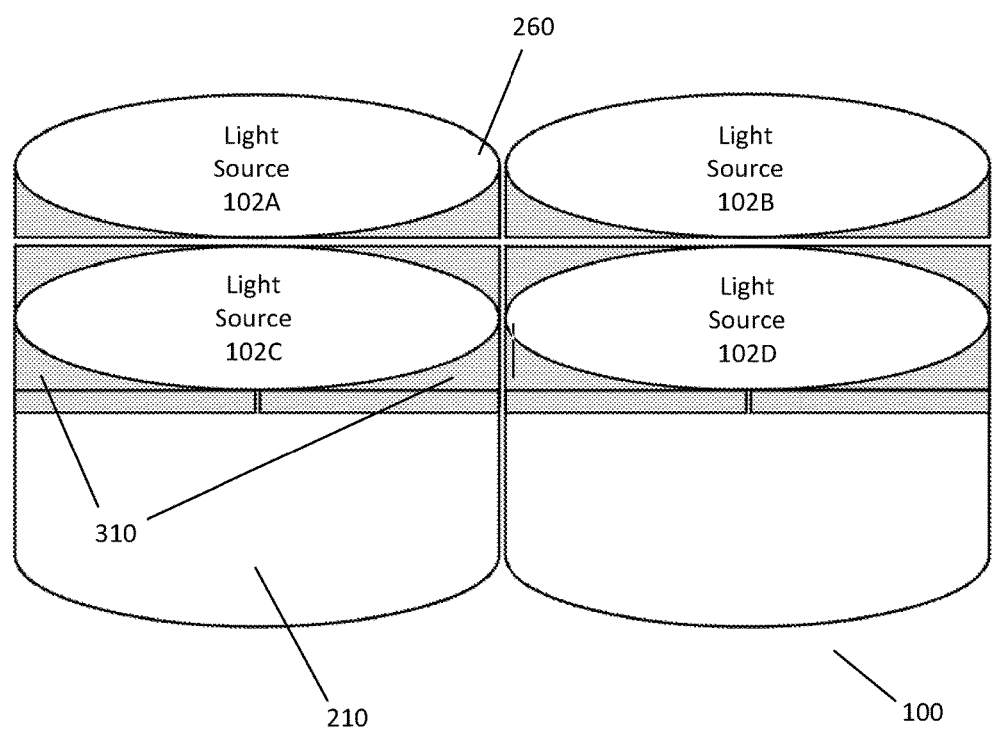
FIG. 6 is a schematic representation of an LED array and system in accordance with an embodiment of the invention.

According to an embodiment is a lighting system 100 with multiple light sources 102A, 102B, 102C, and 102D, each of which includes four interstitial spacers 310 arranged equidistant around the circumference of its optic holder 210, as shown in FIGS. 5 and 6. In FIG. 6, for example, the interstitial spacers 310 are arranged at the upper edge region 260 of the optic holders. The arrangement of the light sources with their interstitial spacers results in a square appearance for each of the light sources, which can be placed together in the tile format illustrated in FIG. 5. The gaps 220 shown in lighting system 100 in FIG. 2 are instead filled with the interstitial spacers 310 in the lighting system 100 in FIGS. 5 and 6, creating a more visually appealing surface.

Optionally, according to one embodiment, the interstitial spacers can be designed such that very small gaps 510 will exist between neighboring interstitial spacers when the lighting system is assembled. This design and arrangement will enable the lighting system to be assembled without requiring exact design parameters, and the gaps 510 can be designed to be substantially imperceptible by the observer. According to another embodiment, rounded corners can be added to the interstitial spacers to conceal any minor misalignment of the corners interstitial spacer.

According to yet another embodiment, such as that shown in FIG. 5, the circuit board or light source holder 200 is manufactured or colored in order to substantially match the color of the interstitial spacers 310, and/or the interstitial spacers 310 are manufactured or colored to substantially match the color of the circuit board or light source holder 200. This will result in a further uniform appearance of the lighting system 100. For example, if the circuit board 200, the optic holder 210, and interstitial spacers 310 are substantially the same color, an observer of lighting system 100 will perceive a substantially uniform surface.

Figure 7:
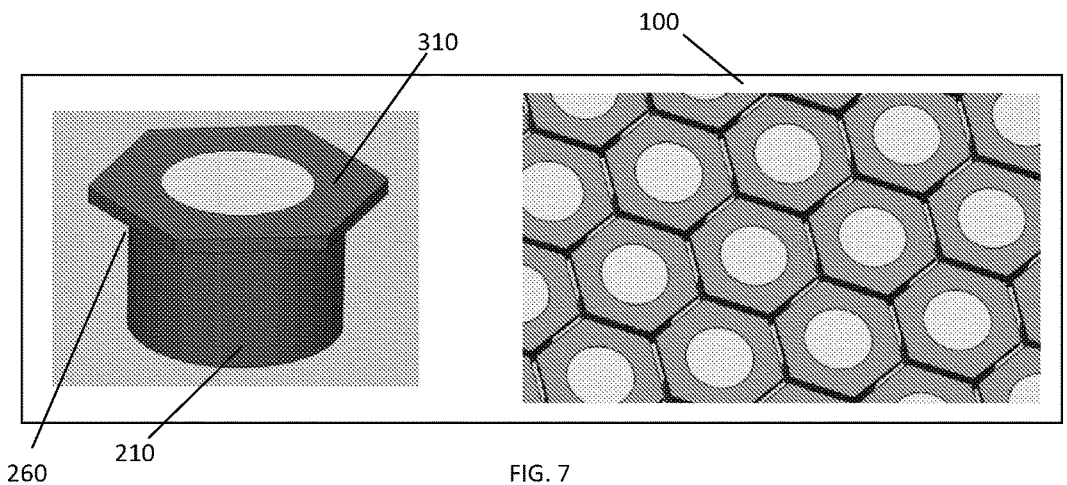
FIG. 7 is a schematic representation of an LED-based light source and optic holder with interstitial spacers, and a schematic representation of an LED array and system, in accordance with an embodiment of the invention.
Figure 8:
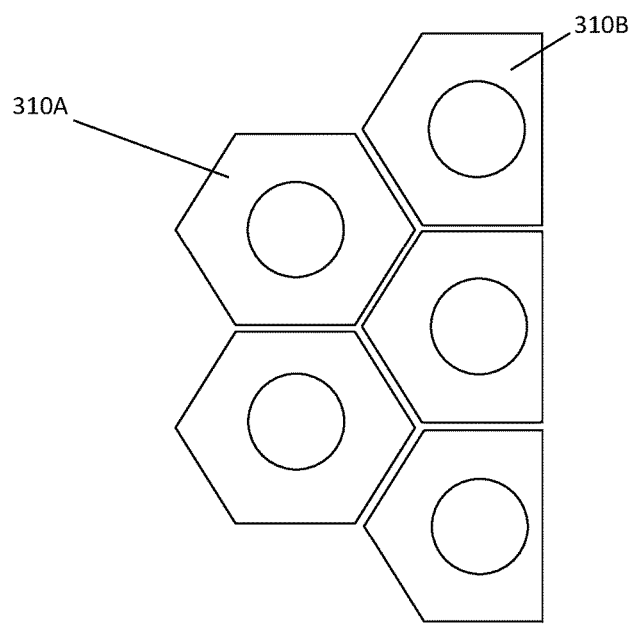
FIG. 8 is a schematic representation of LED-based light sources and optic holders with interstitial spacers in accordance with an embodiment of the invention.

The interstitial spacers can be designed to fill any interstitial space. For example, as shown in the embodiments in FIGS. 7, 8, and 9, the interstitial spacer may adopt any of a wide variety of shapes and sizes. In FIG. 7, for example, each of the interstitial spacers 310 is hexagonal, but fit together with other hexagonal interstitial spacers on all six sides. At an edge of the system, for example, the interstitial spacer 310B may be designed to both fit into place with other hexagonal interstitial spacers 310A internal to the design, and have an edge external to the design, as shown in FIG. 8. Indeed, the interstitial spacers 310 within a lighting system need not be similar or identical; a lighting system can include multiple interstitial spacers 310 each with a unique design, provided that one or more of the interstitial spacers have an edge that fit together to hide a gap between light sources and/or optic holders 210.

Figure 9:
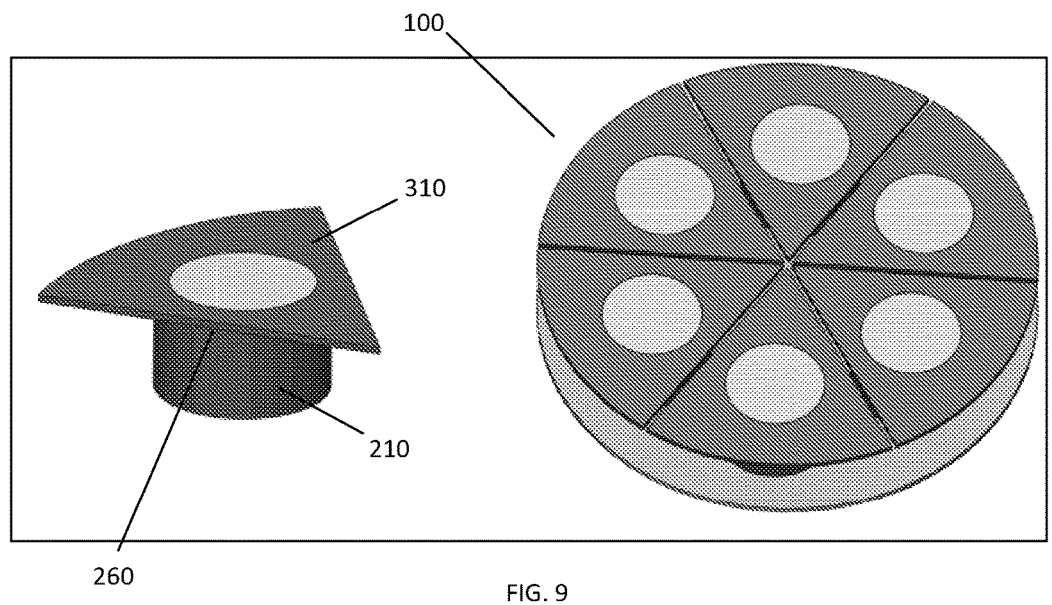
FIG. 9 is a schematic representation of an LED-based light source and optic holder with interstitial spacers, and a schematic representation of an LED array and system, in accordance with an embodiment of the invention.

As yet another example, the interstitial spacer 310 may adopt a substantially non-rectangular shape, as shown in FIG. 9. In this example, one edge of each interstitial spacer 310 has a rounded shape, making the lighting system appear round.

Although the interstitial spacers depicted so far are substantially planar, there is no requirement that any surface of the interstitial spacer be substantially planar. The interstitial spacer surface could be rounded or angular, depending on the design of the lighting system 100. For example, if the lighting system is designed to possess a three-dimensional shape with rounded peaks and valleys, the interstitial spacers can be designed and manufactured to fit the angle and distance of the peaks and valleys of the system.

According to another embodiment, the interstitial spacers 310 are designed to be adjustable to fill gaps of different sizes, either minor differences or substantial differences. For example, the interstitial spacers may comprise flexible/bendable and/or removable extensions that can either be used to fill a gap of larger than expected distance, or can be bent or removed if the gap is either the proper size or closer together than the expected distance. The flexible nature of the extension, which can be composed or rubber, thin plastic, or a similar material, allows the extension to be removed or folded under or over a neighboring interstitial spacer to fill in gaps as required.

Figure 10:
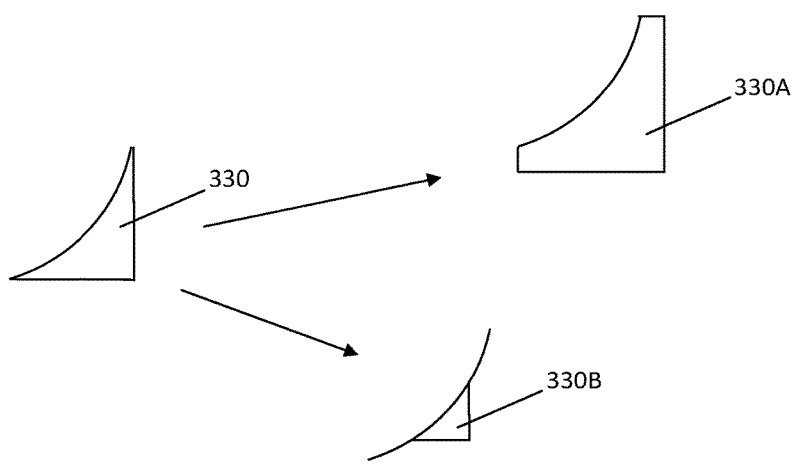
FIG. 10 is a schematic representation of an adjustable interstitial spacer in accordance with an embodiment of the invention.

An interstitial spacer 310 may also be designed to be adjustable to fill in gaps of different sizes. For example, the interstitial spacer can include a portion that can be extended to fill a gap of larger than expected distance, or can be collapsed if the gap is either the proper size or closer together than the expected distance. This adjustable portion can be an accordion-like mechanism capable of extension. As one example shown in FIG. 10, the adjustable interstitial spacer 330 can adopt a first shape 330, an extended shape 330A, and/or a collapsed shape 330B.

Figure 11:
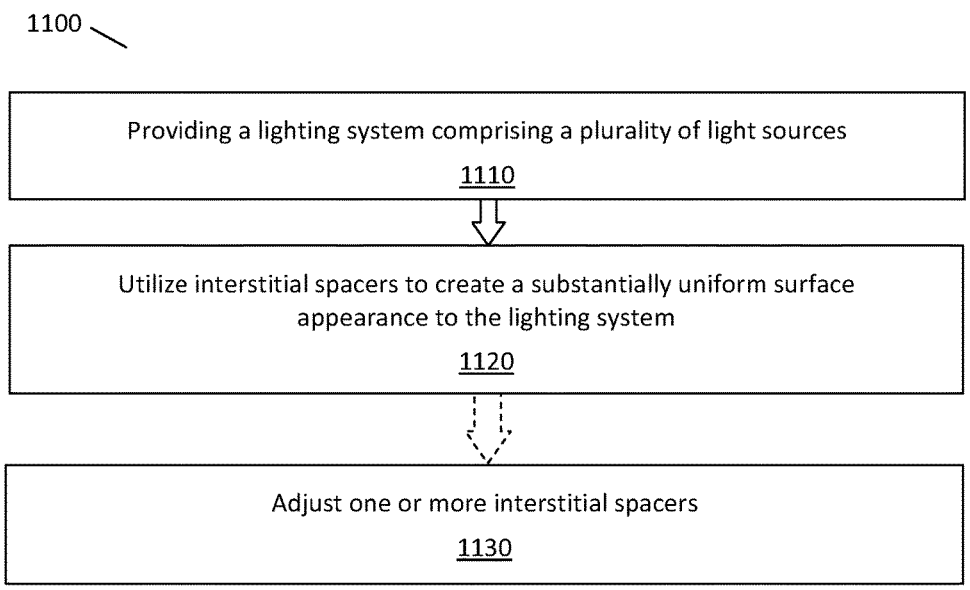
FIG. 11 is a flow chart of a method for creating a surface-like appearance for a lighting system in accordance with an embodiment of the invention.

Referring to FIG. 11, a flow chart illustrating a method 1100 for achieving an aesthetic appearance of a lighting system in accordance with an embodiment of the invention is disclosed. In step 1110, a lighting system 100 is provided. Lighting system 100 can be any of the embodiments described herein or otherwise envisioned, and can include any of the components of the lighting systems described in conjunction with FIGS. 1-10, for example (e.g., optics, optic holders, one or more light source drivers, controllers, memory storage, power sources, etc.). Lighting system 100 includes one or more LED-based light sources 102, each of which may have one or more LEDs. Each light source 102 can be driven to emit light of predetermined character (i.e., color intensity, color temperature) by one or more light source drivers. Many different numbers and various types of light sources (all LED-based light sources, LED-based and non-LED-based light sources alone or in combination, etc.) adapted to generate radiation of a variety of different colors may be employed in the lighting system 100.

In step 1120 of the method, interstitial spacers 310 are included with the system to create a substantially surface-like appearance to an observer of the lighting system 100. The interstitial spacers 310 may be manufactured as an integral component of the optic holder 210, or according to one embodiment, are added to one or more of the optic holders at step 1120. For example, the interstitial spacers can be snapped into place as needed once the light sources and optic holders are placed in the system.

In optional step 1130 of the method, one or more of the interstitial spacers associated with one or more of light sources 310 in lighting system 100 is modified in order to fill in a gap between neighboring light sources or optic holders, or between an optic holder and an edge. For example, an interstitial spacer can be replaced with an interstitial spacer of a more appropriate size, or an adjustable interstitial spacer can be adjusted to fit the interstitial gap. As yet another example, an entire optic holder can be replaced with an optic holder having interstitial spacers of the appropriate size.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A lighting system comprising:
a plurality of LED-based light sources;
a plurality of optic holders, each of which is connected to a respective one of said plurality of LED-based light sources and is arranged to hold an optic in a position suitable to modify light emitted by said LED-based light source, each of the plurality of optic holders comprising an upper edge region, wherein said arrangement results in one or more gaps between one or more optic holders; and
a plurality of interstitial spacers connected to the upper edge region of the plurality of optic holders, wherein the plurality of interstitial spacers are arranged to substantially fill the one or more gaps, wherein a size of at least one of said plurality of interstitial spacers is adjustable.

2. The lighting system of claim 1, wherein each of the plurality of interstitial spacers are of substantially the same shape.

3. The lighting system of claim 1, wherein each of the plurality of interstitial spacers are of substantially the same size.

4. The lighting system of claim 1, wherein at least one of said plurality of interstitial spacers is configured to removably attach to the upper edge region of one of said plurality of optic holders.

5. The lighting system of claim 1, wherein the plurality of optic holders and the plurality of interstitial spacers are substantially the same color.

6. The lighting system of claim 5, wherein the shape of the at least one of said plurality of interstitial spacers is adjustable.

7. The lighting system of claim 1, further comprising a light source holder, wherein each of said plurality of LED-based light sources are connected to the light source holder, and further wherein at least a portion of said light source holder is visible through said gaps.

8. The lighting system of claim 6, wherein said plurality of interstitial spacers are arranged along the upper edge region of the plurality of optic holders to obscure said light source holder.

9. An optic holder system, the optic holder comprising:
an optic; and
one or more interstitial spacers connected to an upper edge region of the optic holder, wherein a size of the one or more interstitial spacers is adjustable.

10. The optic holder system of claim 9, wherein at least one of the interstitial spacers is configured to removably attach to the upper edge region of the optic holder.

11. The optic holder system of claim 9, wherein the shape of the at least one of said plurality of interstitial spacers is adjustable.

12. A method for generating a lighting system, the method comprising the steps of:
providing a lighting system comprising: (i) a plurality of LED-based light sources; (ii) a plurality of optic holders each of which is connected to a respective one of said plurality of LED-based light sources and is arranged to hold an optic in a position suitable to modify light emitted by said LED-based light source, each of the plurality of optic holders comprising an upper edge region, wherein said arrangement results in one or more gaps between one or more optic holders; and
providing a plurality of interstitial spacers connected to the upper edge region of the plurality of optic holders, wherein the plurality of interstitial spacers are arranged to substantially fill the one or more gaps further comprising the step of adjusting one or more of the interstitial spacers to substantially fill the one or more gaps.

* * * * *